United States Patent
Ogasawara et al.

(10) Patent No.: US 10,855,006 B2
(45) Date of Patent: Dec. 1, 2020

(54) COUPLING STRUCTURE OF HOUSING MEMBERS AND STORAGE CASE

(71) Applicant: Yazaki Corporation, Tokyo (JP)

(72) Inventors: Shigeyuki Ogasawara, Shizuoka (JP); Hideto Masuki, Shizuoka (JP)

(73) Assignee: YAZAKI CORPORATION, Tokyo (JP)

(*) Notice: Subject to any disclaimer, the term of this patent is extended or adjusted under 35 U.S.C. 154(b) by 306 days.

(21) Appl. No.: 15/823,461

(22) Filed: Nov. 27, 2017

(65) Prior Publication Data
US 2018/0175522 A1     Jun. 21, 2018

(30) Foreign Application Priority Data

Dec. 20, 2016   (JP) .................................. 2016-247076

(51) Int. Cl.
*H01R 11/28*    (2006.01)
*H01M 2/10*     (2006.01)
(Continued)

(52) U.S. Cl.
CPC ........ *H01R 11/281* (2013.01); *H01M 2/1077* (2013.01); *H01M 10/482* (2013.01);
(Continued)

(58) Field of Classification Search
CPC .. H01M 2/206; H01M 2/1077; H01M 10/482; H01M 2220/20; H01M 2/202;
(Continued)

(56) References Cited

U.S. PATENT DOCUMENTS

| 9,150,115 B2 | 10/2015 | Ikeda et al. |
| 2012/0164509 A1 | 6/2012 | Ogasawara et al. |

(Continued)

FOREIGN PATENT DOCUMENTS

| CN | 102868126 A | 1/2013 |
| JP | 60-151221 U | 10/1985 |

(Continued)

OTHER PUBLICATIONS

Japanese Office Action for the related Japanese Patent Application No. 2016-247076 dated Mar. 26, 2019.

*Primary Examiner* — Basia A Ridley
*Assistant Examiner* — Heng M. Chan
(74) *Attorney, Agent, or Firm* — Kenealy Vaidya LLP

(57) ABSTRACT

A first coupling body is disposed as part of a housing body, has a bottom part, and has a first and a second vertical wall parts. A second coupling body is formed so as to cover a space between the first vertical wall part and the second vertical wall part in the bottom part inside the housing chamber. The holding mechanism includes a first projection projecting from a first end of the second coupling body toward the first vertical wall part side, a second projection projecting from a second end of the second coupling body toward the second vertical wall part side, a first through-hole that is formed in the first vertical wall part, and a second through-hole that is formed in the second vertical wall part, the first end covering the first vertical wall part, the second end covering the second vertical wall part.

10 Claims, 15 Drawing Sheets

(51) Int. Cl.
*H01M 10/48* (2006.01)
*H01R 9/22* (2006.01)
*H01M 2/02* (2006.01)
*H01M 2/20* (2006.01)

(52) U.S. Cl.
CPC .......... *H01M 10/486* (2013.01); *H01R 9/226* (2013.01); *H01M 2/0207* (2013.01); *H01M 2/206* (2013.01); *H01M 2220/20* (2013.01)

(58) Field of Classification Search
CPC ...... H01M 2/204; H01M 2/1083; H01M 2/20; H01M 10/0525; H01M 10/4207; H01M 2/34; H01M 10/613; H01M 2/305; H01M 10/425; H01M 10/6554; H01M 10/6557; H01M 2010/4271; H01M 2200/106; H01M 2/043; H01M 2/10; H01M 2/1072; H01M 10/0413; H01M 10/052; H01M 10/48; H01M 10/647; H01M 10/6552; H01M 10/6561; H01M 10/6563; H01M 2010/4278; H01M 2/0245; H01M 2/06; H01M 2/1016; H01M 2/1061; H01M 2/1252; H01M 2/266; H01M 2/30; H01M 2/347; H01M 10/0431; H01M 10/0481; H01M 10/12; H01M 10/345; H01M 10/441; H01M 10/486; H01M 10/488; H01M 10/6566; H01M 2200/103; H01M 2220/10; H01M 2/0212; H01M 2/0217; H01M 2/04; H01M 2/08; H01M 2/1005; H01M 2/1022; H01M 2/12; H01M 2/22; H01M 2/24; H01M 2/26; H01M 2/28; H01M 2/344; H01M 2/348; H01R 11/288; H01R 11/289; H01R 11/281; H01R 9/226; H01R 13/20; H01R 13/28; H01R 13/447; H01R 13/465; H01R 13/72; H01R 13/73; H01R 25/14; H01R 29/00; H01R 31/08; H01R 31/085; H01R 43/0221; H01R 43/20; H01R 4/029; H01R 4/185; H01R 4/242; H01R 4/30; H01R 9/2458; H01R 9/2475; H01R 9/2683; H02G 5/00; H02G 3/0437
See application file for complete search history.

(56) References Cited

U.S. PATENT DOCUMENTS

| | | | | |
|---|---|---|---|---|
| 2013/0010449 | A1* | 1/2013 | Ikeda | H02G 3/0437 |
| | | | | 361/826 |
| 2015/0357620 | A1 | 12/2015 | Nakayama | |
| 2015/0372281 | A1* | 12/2015 | Ogasawara | H01M 10/482 |
| | | | | 439/212 |
| 2018/0287355 | A1* | 10/2018 | Nomura | H02G 3/0437 |

FOREIGN PATENT DOCUMENTS

| | | | |
|---|---|---|---|
| JP | 8-51714 A | 2/1996 | |
| JP | 10-201041 A | 7/1998 | |
| JP | 2011-077031 A | 4/2011 | |
| JP | 2015-116109 A | 6/2015 | |
| JP | 2016-6722 A | 1/2016 | |
| JP | 2016-006722 A | 1/2016 | |
| WO | WO-2017061452 A1 * | 4/2017 | ............... H01B 7/00 |

\* cited by examiner

COUPLING STRUCTURE OF HOUSING MEMBERS AND STORAGE CASE

CROSS-REFERENCE TO RELATED APPLICATION(S)

The present application claims priority to and incorporates by reference the entire contents of Japanese Patent Application No. 2016-247076 filed in Japan on Dec. 20, 2016.

BACKGROUND OF THE INVENTION

1. Field of the Invention

The present invention relates to a coupling structure of housing members and a storage case.

2. Description of the Related Art

A storage case has been known that includes a plurality of housing members in each of which a housing object, such as a conductive member (an electric wire, for example), is housed. The storage case is constituted as a coupling structural body for the housing members and includes a coupling structure for coupling two housing members to be coupled. The coupling structure includes a first coupling body disposed in one housing member and a second coupling body disposed in the other housing member. This type of storage case is disclosed in Japanese Patent Application Laid-open No. 2016-6722, for example. For example, the first coupling body is disposed as part of a housing body of the housing member in which a housing object is housed, has a bottom part that forms a part of a housing chamber for the housing object, and has a first vertical wall part and a second vertical wall part that are vertically disposed from the bottom part with a space interposed between the first vertical wall part and the second vertical wall part. A cantilever flexible piece part that is sandwiched between two slits and has flexibility and a pawl part that is disposed at a free end of the flexible piece part on the bottom part side are formed in both of the first vertical wall part and the second vertical wall part. On the other hand, the second coupling body includes a piece part that is superposed on the bottom part in the housing chamber. The piece part is put between the bottom part and the pawl parts so as to be locked.

In the conventional coupling structure, the respective slits of the first vertical wall part and the second vertical wall part are open while the inside and the outside of the housing chamber are communicated with each other even after the first coupling body is coupled to the second coupling body. For this reason, the conventional coupling structure has difficulty in improving blocking property of the housing chamber.

SUMMARY OF THE INVENTION

It is an object of the present invention to provide a coupling structure of housing members and a storage case that can improve blocking property of the housing chamber.

In order to achieve the above mentioned object, a coupling structure of housing members according to one aspect of the present invention includes a first coupling body that is disposed in one of two housing members to be coupled; a second coupling body that is disposed in the other of the two housing members; and a holding mechanism that holds the first coupling body and the second coupling body in a state in which the first coupling body and the second coupling body are coupled to each other, wherein the first coupling body is disposed as part of a housing body of the housing member in which at least a conductive member is housed as a housing object, has a bottom part that forms a part of a housing chamber for the housing object, and has a first vertical wall part and a second vertical wall part that are vertically disposed from the bottom part with a space interposed between the first vertical wall part and the second vertical wall part, the second coupling body is formed so as to cover a space between the first vertical wall part and the second vertical wall part in the bottom part inside the housing chamber, the holding mechanism includes a first projection that projects from a first end of the second coupling body toward a side of the first vertical wall part, a second projection that projects from a second end of the second coupling body toward a side of the second vertical wall part, a first through-hole that is formed at least in the first vertical wall part and into which the first projection is inserted, and a second through-hole that is formed at least in the second vertical wall part and into which the second projection is inserted, the first end covering at least part of the first vertical wall part, the second end covering at least part of the second vertical wall part, and the second coupling body, the first through-hole, and the second through-hole are formed such that the second coupling body covers the first through-hole and the second through-hole from an inside of the housing chamber when the first projection and the second projection are respectively inserted into the first through-hole and the second through-hole.

According to another aspect of the present invention, in the coupling structure of housing members, it is possible to further includes a position adjusting mechanism that causes the first coupling body and the second coupling body kept in a coupled state to be moved relative to each other along an arrangement direction of the two housing members that are coupled to each other.

According to still another aspect of the present invention, in the coupling structure of housing members, it is possible to configure that the housing member that has the first coupling body includes the housing body in which the second coupling body and the housing object are housed through a housing port, and a lid body that covers the housing port, the housing body has flexibility so that the first vertical wall part and the second vertical wall part are both capable of being bent with a side of the bottom part as a fulcrum, and also uses, as the housing port, an opening between respective free ends of the first vertical wall part and the second vertical wall part, the free ends being on a side opposite to the side of the bottom part, and the lid body has a first locking part and a second locking part that respectively pinch the free end of the first vertical wall part and the free end of the second vertical wall part while locking the free ends, with the coupled state of the first coupling body and the second coupling body held by the holding mechanism.

According to still another aspect of the present invention, in the coupling structure of housing members, it is possible to configure that the conductive member is an electric wire that is electrically connected both to one of two electrode terminals included in each of a plurality of arranged battery cells and to a battery monitoring unit that monitors a battery state of the battery cells, or/and is an electric wire that electrically connects a temperature detector that detects temperatures of the battery cells to the battery monitoring unit.

In order to achieve the above mentioned object, a storage case according to still another aspect of the present invention includes a plurality of housing members in each of which at least a conductive member is housed as a housing object; and a coupling structure that couples two of the housing members to be coupled, the coupling structure including a first coupling body that is disposed in one of the two housing members to be coupled; wherein the coupling structure includes: a first coupling body that is disposed in one of the two housing members to be coupled; a second coupling body that is disposed in the other of the two housing members; and a holding mechanism that holds the first coupling body and the second coupling body in a state in which the first coupling body and the second coupling body are coupled to each other, the first coupling body is disposed as part of a housing body of the housing member in which the housing object is housed, has a bottom part that forms a part of a housing chamber for the housing object, and has a first vertical wall part and a second vertical wall part that are vertically disposed from the bottom part with a space interposed between the first vertical wall part and the second vertical wall part, the second coupling body is formed so as to cover a space between the first vertical wall part and the second vertical wall part in the bottom part inside the housing chamber, the holding mechanism includes a first projection that projects from a first end of the second coupling body toward a side of the first vertical wall part, a second projection that projects from a second end of the second coupling body toward a side of the second vertical wall part, a first through-hole that is formed at least in the first vertical wall part and into which the first projection is inserted, and a second through-hole that is formed at least in the second vertical wall part and into which the second projection is inserted, the first end covering at least part of the first vertical wall part, the second end covering at least part of the second vertical wall part, and the second coupling body, the first through-hole, and the second through-hole are formed such that the second coupling body covers the first through-hole and the second through-hole from an inside of the housing chamber when the first projection and the second projection are respectively inserted into the first through-hole and the second through-hole.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

The following describes in detail an embodiment of a coupling structure of housing members and a storage case according to the present invention with reference to the drawings. Note that the embodiment does not limit the invention.

Embodiment

One embodiment of a coupling structure of housing members and a storage case according to the present invention is described below with reference to FIG. 1 to FIG. 15.

Figure 1:
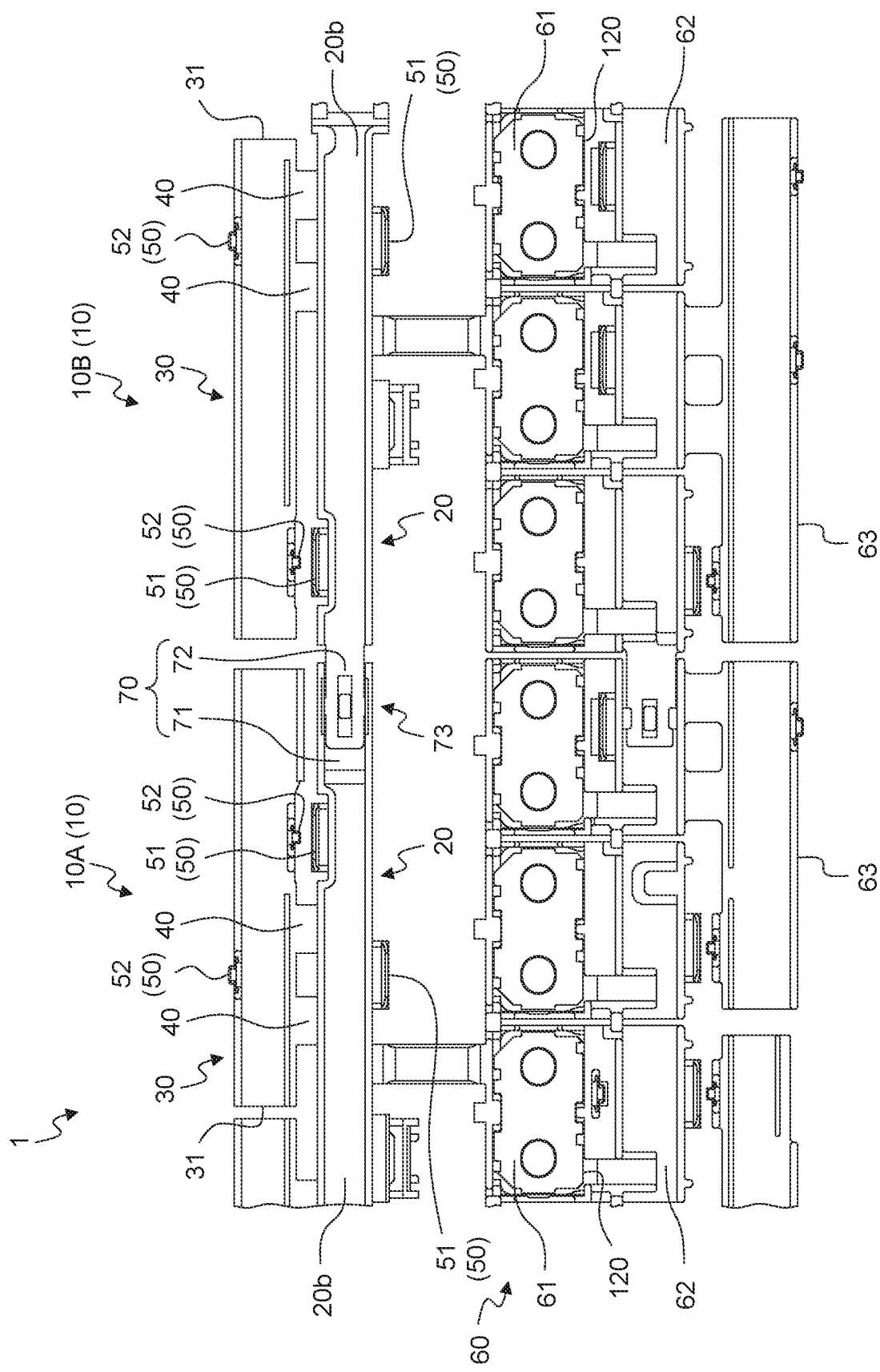
FIG. 1 is a plan view partially illustrating a storage case of an embodiment with a lid body open.
Figure 2:
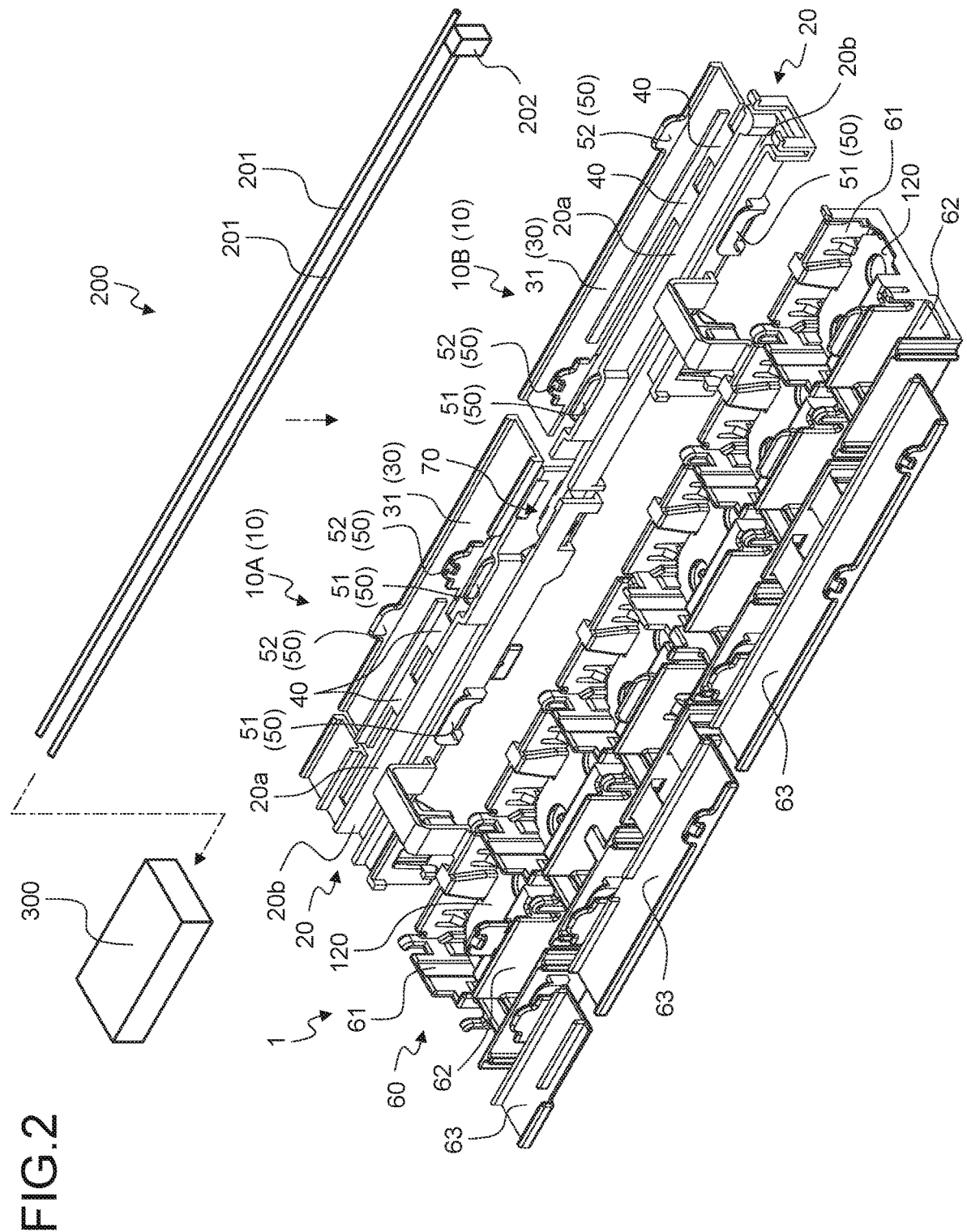
FIG. 2 is a perspective view partially illustrating the storage case of the embodiment with the lid body open.

The reference numeral 1 in FIG. 1 and FIG. 2 denotes a storage case of the present embodiment. The storage case 1 of the present embodiment includes a housing member 10 in which at least a conductive member is housed as a housing object. The storage case 1 of the present embodiment is attached to a battery module 100 illustrated in FIG. 3, and is illustrated as an example of housing therein a conductive module 200 (FIG. 2) for obtaining battery information of the battery module 100. The storage case 1 constitutes a battery pack together with the battery module 100 and the conductive module 200. The battery module 100 and the conductive module 200 are first described briefly.

Figure 3:
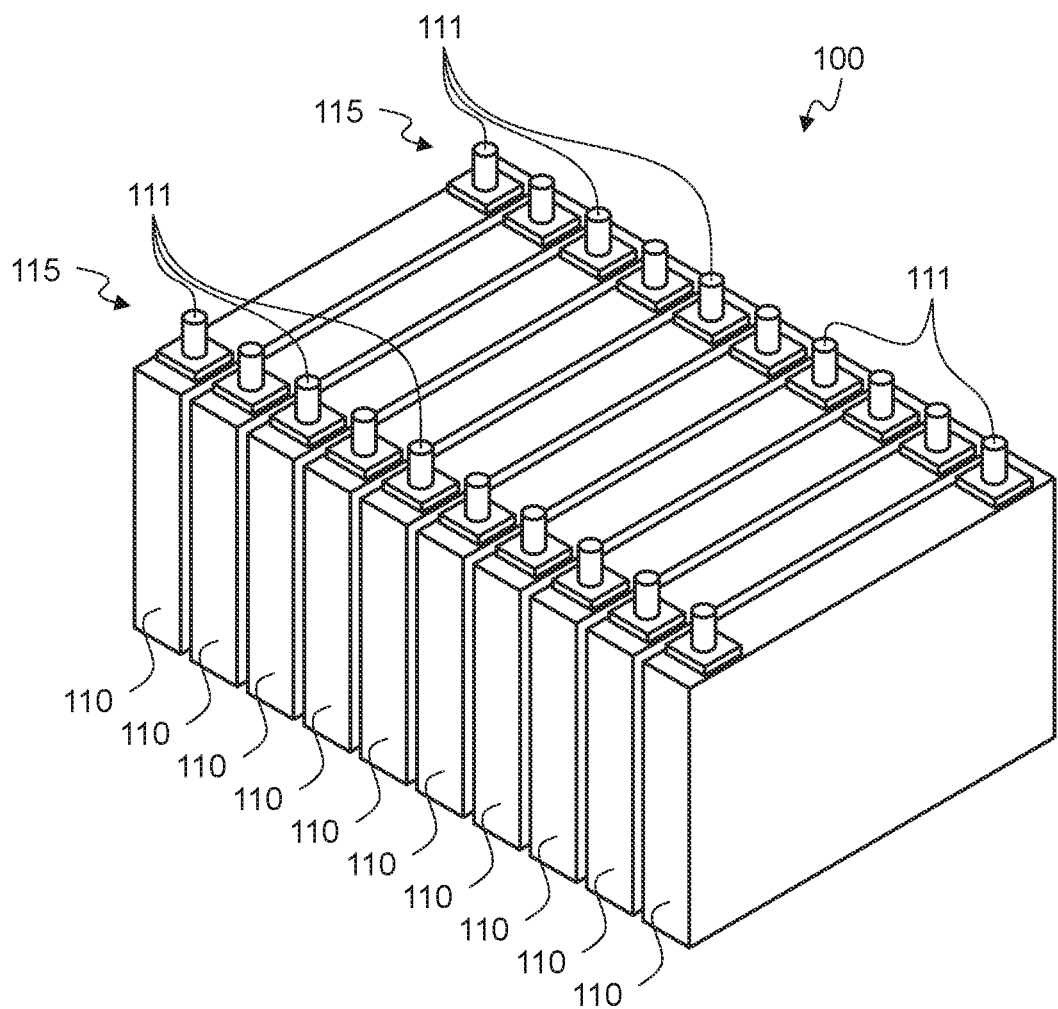
FIG. 3 is a perspective view illustrating a battery module to which the storage case of the embodiment is attached.
Figure 4:
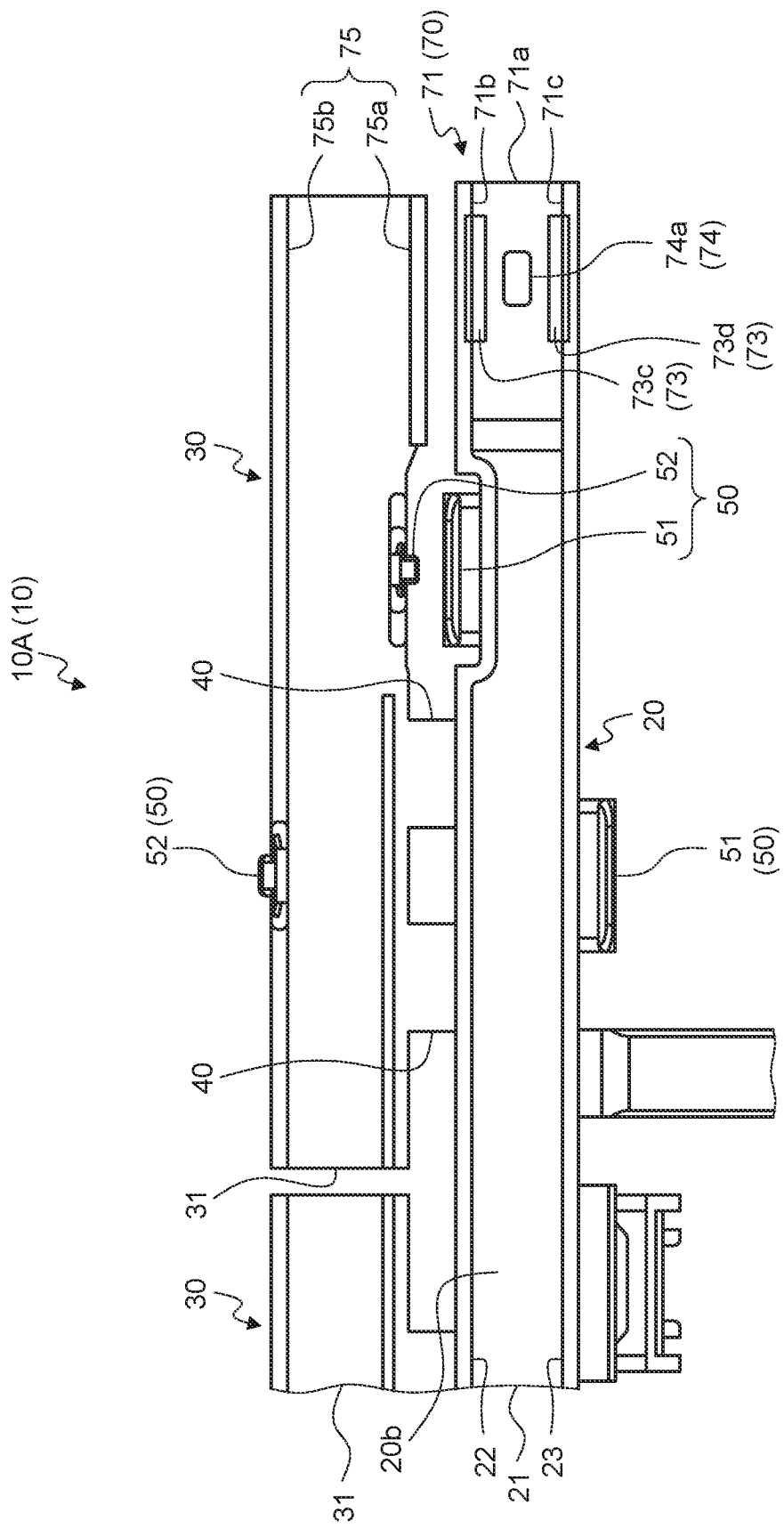
FIG. 4 is a plan view partially illustrating a first housing member with the lid body open.

The battery module 100 is mounted to a vehicle, such as an electric vehicle and a hybrid vehicle, serving as a battery pack, and includes a plurality of battery cells 110 (FIG. 3). In the battery module 100, the battery cells 110 are arranged in a row while electrode terminals 111 on either side of the respective battery cells 110 are lined up and electrode terminals 111 on the other side are also lined up. In the battery module 100, the electrode terminals 111 are lined up in two places, each of which constitutes an electrode terminal group 115 made up of a plurality of electrode terminals 111. In the battery module 100, the arrangement direction of the battery cells 110 (hereinafter referred to as the "cell arrangement direction") is aligned with the arrangement direction of the electrode terminals 111 (hereinafter referred to as the "terminal arrangement direction") in the respective electrode terminal groups 115. Note that the arrangement of the battery cells 110 is maintained by way of cell housing members in which the respective battery cells 110 are housed and holding structural bodies in which the respective battery cells 110 are held, for example, which is not illustrated.

In the battery module 100, two electrode terminals 111 that are adjacent to each other in the cell arrangement direction are coupled by a conductive busbar 120 (FIG. 1 and FIG. 2) for each electrode terminal group 115. The busbar 120 is formed of a conductive material such as metal and is provided for each combination of two adjacent electrode terminals 111. Two adjacent electrode terminals 111 are physically and electrically connected by the busbar 120 for each combination thereof. The exemplary busbar 120 is formed into a rectangular flat plate shape. For example, in a case in which each electrode terminal 111 has a plate shape, the busbar 120 is physically and electrically connected to the electrode terminals 111 by welding (laser welding, for example). On the other hand, in a case in which each electrode terminal 111 is an electrode pole, throughholes into which the corresponding electrode terminals 111 are inserted are formed in the busbar 120, and the busbar 120 is fixed to the electrode terminals 111 by screwing, for example, thereby physically and electrically connecting the electrode terminals 111 to each other. Note that, in the battery module 100, two electrode terminals 111 are present that are not coupled by the busbar 120. One of the electrode terminals 111 is what is called a total positive terminal and the other is what is called a total negative terminal.

The conductive module 200 electrically connects the battery cells 110 side to a battery monitoring unit 300 (FIG. 2). The battery monitoring unit 300 is an apparatus that monitors a battery state of the battery cells 110 and is attached to the body of a vehicle, for example. The conductive module 200 is placed in at least one of the two electrode terminal groups 115, for example. The conductive module 200 includes at least a conductive member 201.

The conductive member 201 is a conductive member that is electrically connected both to one of the two electrode terminals 111 included in each of the arranged battery cells 110 and to the battery monitoring unit 300, or/and is a conductive member that electrically connects an electronic component 202 to the battery monitoring unit 300. The former conductive member 201 is directly or indirectly attached to the electrode terminals 111 so as to be electrically connected thereto. For example, the conductive member 201 is electrically connected to the electrode terminals 111 through the corresponding busbars 120. In this case, the busbars 120 may be regarded as a constituent of the conductive module 200. By contrast, the latter conductive member 201 is physically and electrically connected to the electronic component 202 and constitutes the conductive module 200 together with the electronic component 202. The electronic component 202 can be considered to be applied to a temperature detector. A temperature detector is an apparatus that detects the temperature of at least one of the arranged battery cells 110. For example, the temperature detector is a temperature sensor, such as a thermistor, that detects temperatures of the battery cells 110, and is prepared for each battery cell 110 to be detected.

The conductive member 201 is extended in the terminal arrangement direction when the conductive module 200 is attached to the battery module 100. As the exemplary conductive member 201, an electric wire is used in which a core wire serving as an electric conductor is covered with a coating serving as an insulator. The exemplary conductive module 200 is provided with a plurality of conductive members 201, to each of which the electronic component 202 is connected. A combination of the conductive members 201 and the electronic components 202 are collectively housed in the housing member 10.

The storage case 1 is described next.

Figure 7:
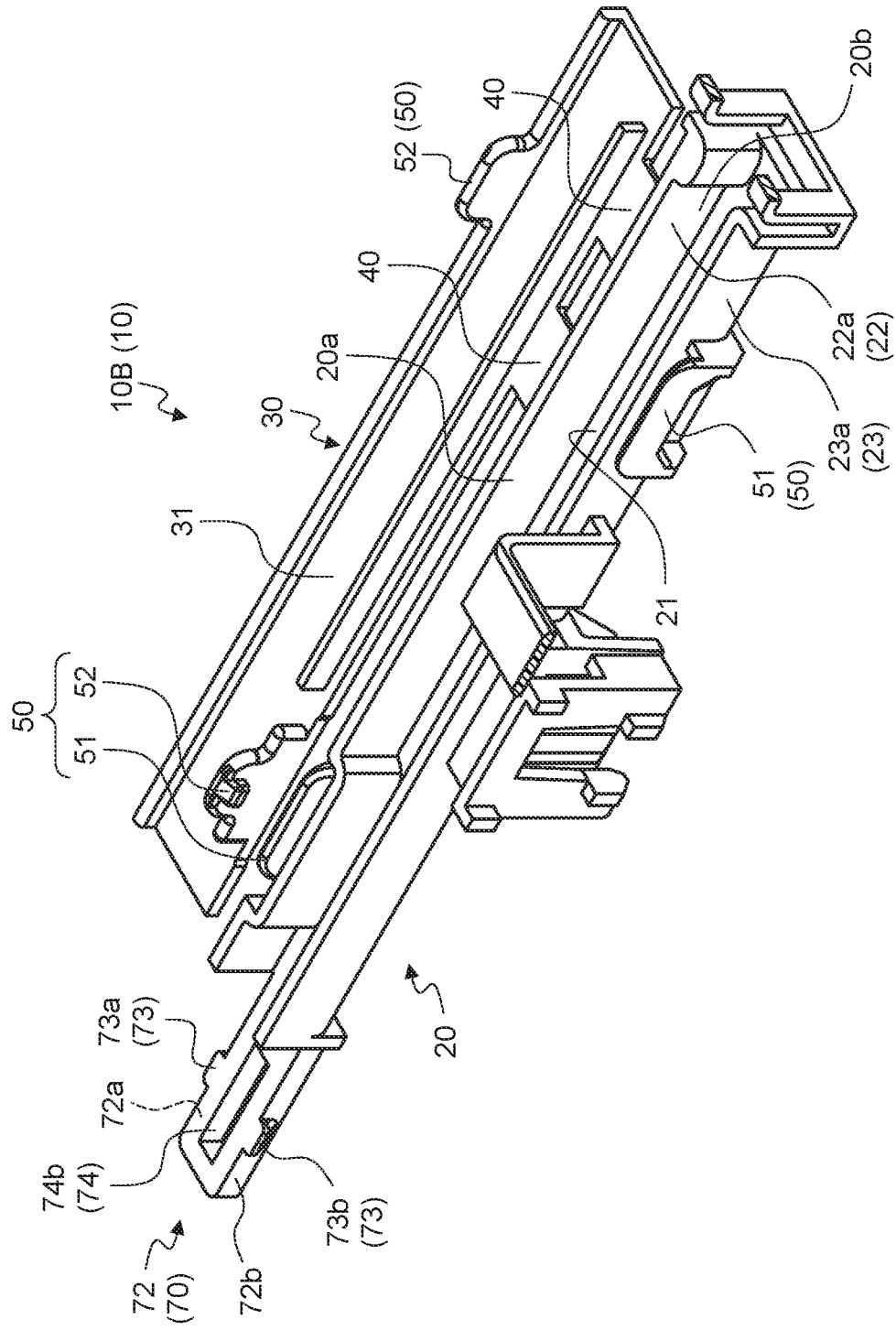
FIG. 7 is a perspective view partially illustrating the second housing member with the lid body open.
Figure 8:
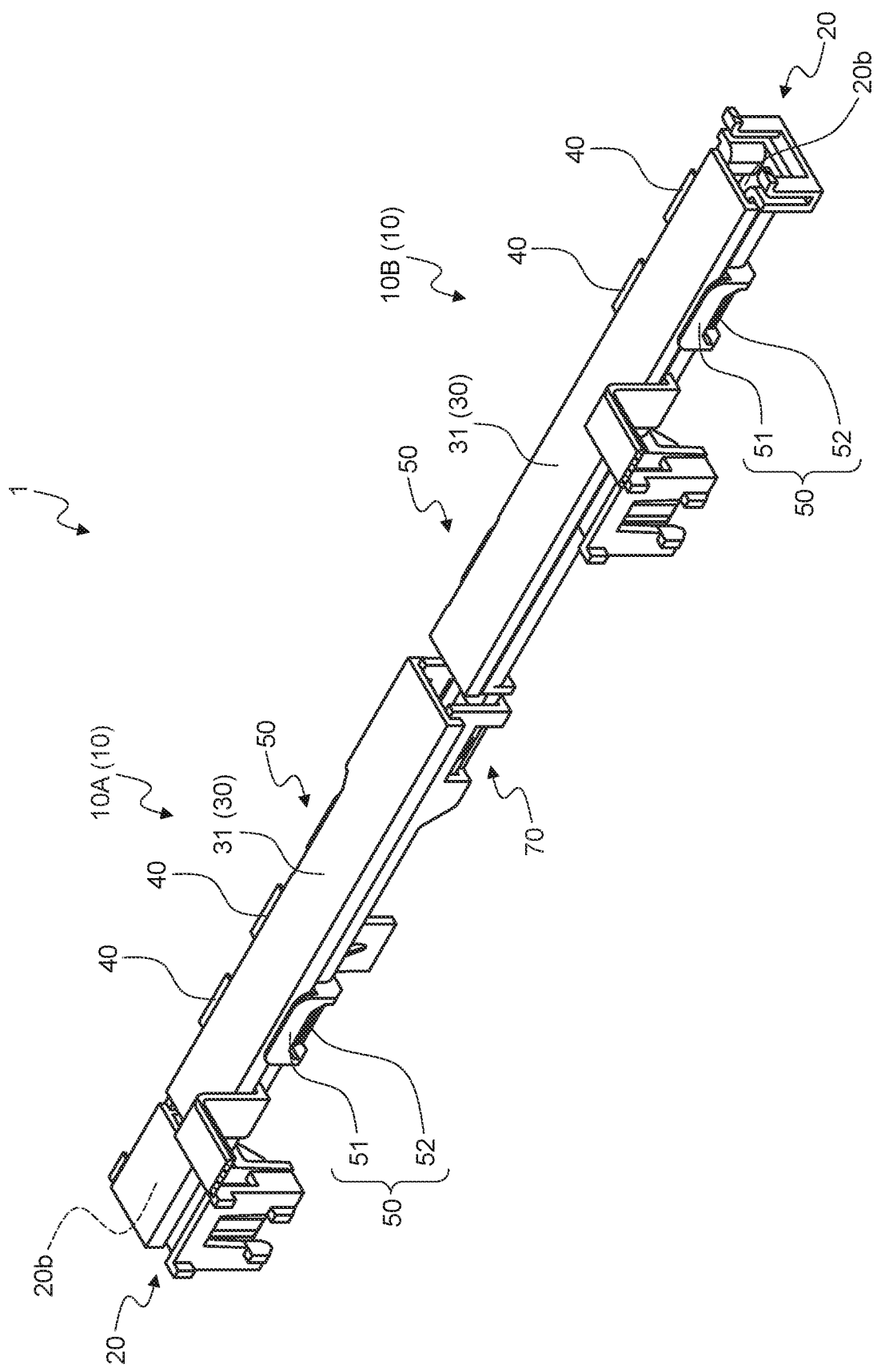
FIG. 8 is a perspective view partially illustrating the first housing member and the second housing member that are coupled to each other with the lid body closed.

The storage case 1 includes a plurality of housing members 10 in each of which a housing object is housed. The housing member 10 is formed of an insulating material such as a synthetic resin. The housing member 10 has a housing body 20 in which the housing object is housed through a housing port 20a, a lid body 30 that covers the housing port 20a, and a hinge body 40 that turns the lid body 30 relative to the housing body 20 (FIG. 1, FIG. 2, and FIG. 4 to FIG. 7). The hinge body 40 turns the lid body 30 relative to the housing body 20 between an open position to the housing port 20a (FIG. 1, FIG. 2, and FIG. 4 to FIG. 7) and a blocked position to the housing port 20a (FIG. 8). The housing member 10 has a holding mechanism 50 to cause the lid body 30 to be held by the housing body 20 at the blocked position. Furthermore, the exemplary housing member 10 also has a holding body 60 that holds the busbars 120 (FIG. 1 and FIG. 2). In the storage case 1, the housing members 10 are arranged along the terminal arrangement direction. The storage case 1 includes a coupling structure 70 that couples two housing members 10 to be coupled to each other, and the coupling structure 70 links together the housing members 10 that are adjacent to each other along the terminal arrangement direction. Herein, the storage case 1 includes a first housing member 10A and a second housing member 10B as the housing member 10, and the first housing member 10A and the second housing member 10B are coupled by the coupling structure 70. The storage case 1 has a mounting mechanism provided in a space with each of the holding structural bodies described above, for example, and is attached to the battery module 100 through the holding structural bodies, which is not illustrated.

Figure 5:
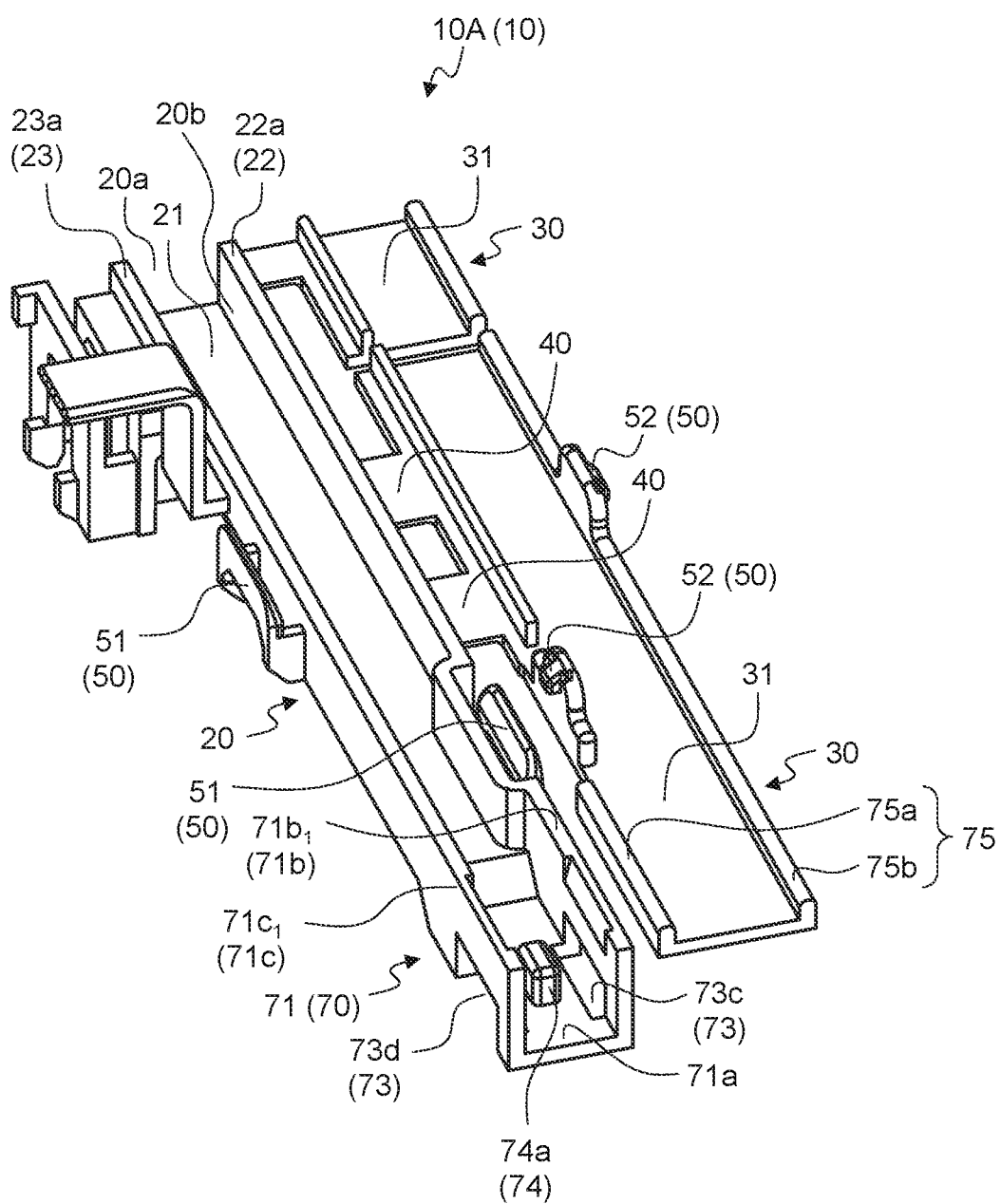
FIG. 5 is a perspective view partially illustrating the first housing member with the lid body open.
Figure 6:
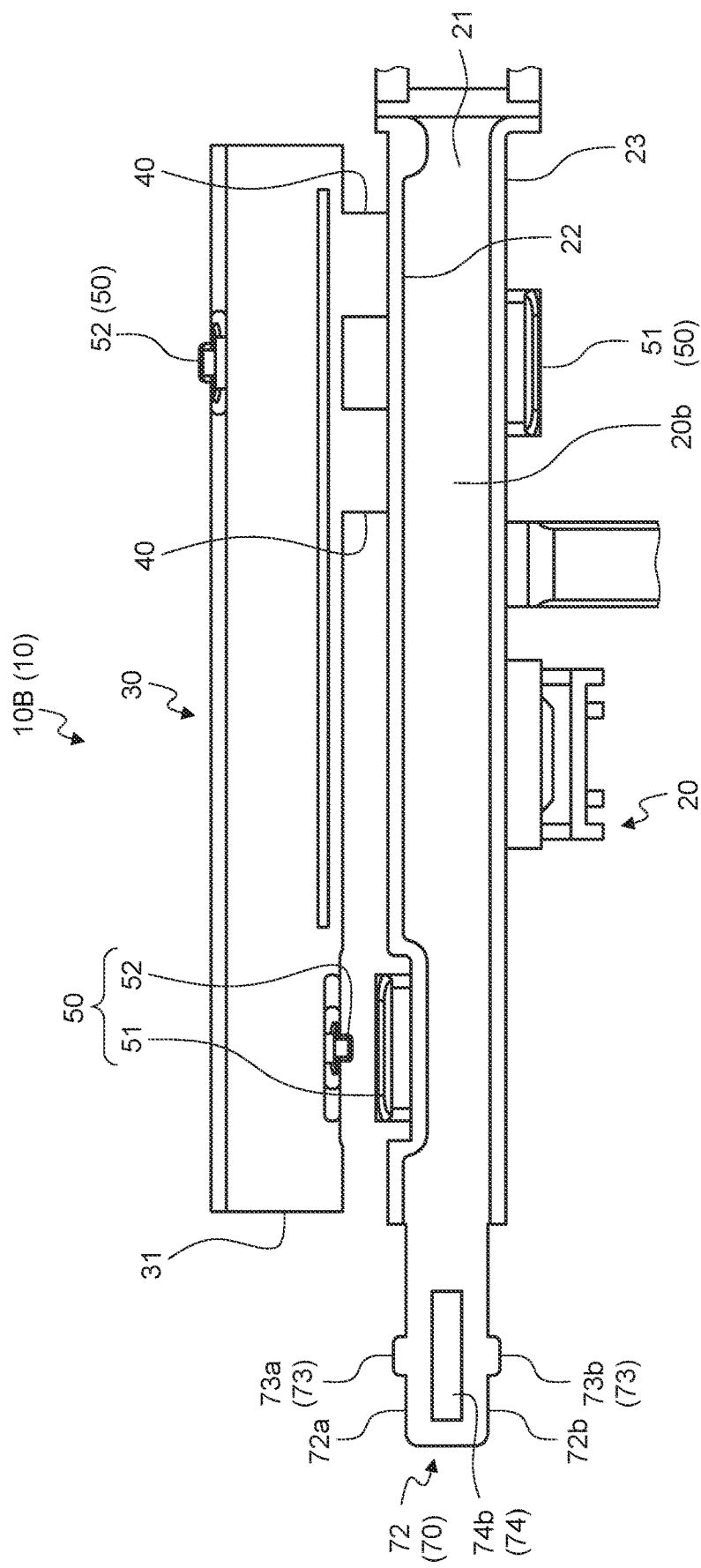
FIG. 6 is a plan view partially illustrating a second housing member with the lid body open.

The housing body 20 has a bottom part 21, a first second vertical wall part 22, and a second vertical wall part 23. The first second vertical wall part 22 and the second vertical wall part 23 are vertically disposed from the bottom part 21 with a space interposed between the first vertical wall part 22 and the second vertical wall part 23 (FIG. 4 to FIG. 7). In the housing body 20, a space surrounded by the bottom part 21, the first vertical wall part 22, and the second vertical wall part 23 constitutes a housing chamber 20b, in which a housing object is housed. The housing body 20 has the bottom part 21, the first vertical wall part 22, and the second vertical wall part 23 extended in the terminal arrangement direction. The bottom part 21 or the bottom part 21 side of the housing body 20 is placed on the battery module 100. In such a placed state, planes of the first vertical wall part 22 and the second vertical wall part 23 face each other in a direction orthogonal to the terminal arrangement direction, and the first vertical wall part 22 and the second vertical wall part 23 are suspended from both ends of the bottom part 21 in the orthogonal direction. In the exemplary housing body 20, the bottom part 21, the first vertical wall part 22, and the second vertical wall part 23 are formed into a substantially rectangular plate shape, and are formed such that a section orthogonal to the terminal arrangement direction has a U shape. In the housing body 20, an opening between respective free ends (free ends on the side opposite to the bottom part 21 side) 22a, 23a of the first vertical wall part 22 and the second vertical wall part 23 are used as the housing port 20a (FIG. 5 and FIG. 7). The free ends 22a, 23a face each other in a direction orthogonal to the plane of the bottom part 21 and in a direction orthogonal to the terminal arrangement direction in the corresponding positions in the terminal arrangement direction. Additionally, the first vertical wall part 22 and the second vertical wall part 23 both have flexibility of being capable of being bent with the bottom part 21 side as a fulcrum. Consequently, the space between the free end 22a of the first vertical wall part 22 and the free end 23a of the second vertical wall part 23 can be changed by applying external force to the first vertical wall part 22 and the second vertical wall part 23 in the housing body 20.

The lid body 30 has a lid part 31 having a shape fitted to the housing port 20a (FIG. 1, FIG. 2, and FIG. 4 to FIG. 7).

The hinge body 40 couples an edge that constitutes the opening serving as the housing port 20a in the housing body 20 to an end of the lid part 31 in the lid body 30, enabling relative turning operation between the housing body 20 and the lid body 30. In the housing body 20, the free end 22a of the first vertical wall part 22 and the free end 23a of the second vertical wall part 23 are present as edges of the housing body 20. The hinge body 40 couples one of the free end 22a of the first vertical wall part 22 and the free end 23a of the second vertical wall part 23. In this example, the hinge body 40 couples the free end 22a of the first vertical wall part 22 to one end with the turning axis in the hinge body 40 as a boundary (FIG. 4 to FIG. 7). Meanwhile, the hinge body 40 couples the other end with the turning axis in the hinge body 40 as a boundary to the end of the lid part 31 that is adjacent to the free end 22a when the housing body 20 and the lid body 30 are in the blocked position. Herein, as the hinge body 40, what is called a living hinge is illustrated that is thin, rectangular, and flexible and that is formed with the housing body 20 and the lid body 30. Thus, the exemplary hinge body 40 is caused to bend when the housing port 20a is covered with the lid body 30. In the hinge body 40, the central axis of rotation between the housing body 20 and the lid body 30 in bending serves as the turning axis. The hinge body 40, for example, arranges the housing body 20 and the lid body 30 in a row when in the open position, and causes the housing port 20a of the housing body 20 to be covered with the lid body 30 when in the blocked position.

The holding mechanism 50 is placed between the housing body 20 and the lid body 30, and holds the lid body 30 to the housing body 20 in the blocked position in which the housing port 20a is blocked. The holding mechanism 50 includes a first engaging body 51 disposed in one of the housing body 20 and the lid body 30, and a first engaged body 52 disposed in the other (FIG. 4 to FIG. 7). The first engaging body 51 and the first engaged body 52 are formed to be fully engaged with each other so as to hold the lid body 30 to the housing body 20 in the blocked position. In the holding mechanism 50, the first engaging body 51 and the first engaged body 52 are fully engaged with each other with relative turning operation between the housing body 20 and the lid body 30 through the hinge body 40.

For example, the holding mechanism 50 is structured as a lock mechanism in which the first engaged body 52 is formed as a locked pawl and the first engaging body 51 is formed as a locking body on which a pawl part of the first engaged body 52 is caught. In this example, the first engaging body 51 is disposed in the housing body 20, and the first engaged body 52 is disposed in the lid body 30. The first engaging body 51 is disposed such that a locking part on which the pawl part of the first engaged body 52 is caught to be locked is placed on or near the edge that constitutes the opening serving as the housing port 20a in the housing body 20. Meanwhile, the first engaged body 52 is disposed while projecting to the end of the lid part 31 that is adjacent to the edge of the housing body 20 in the blocked position. In the holding mechanism 50, the pawl part of the first engaged body 52 is caught on the first engaging body 51 to be engaged in the blocked position, so that the first engaging body 51 and the first engaged body 52 are in the full engagement state.

The holding body 60 is formed to hold a plurality of busbars 120 in the terminal arrangement direction. The exemplary holding body 60 is formed to have a holding chamber 61 for each busbar 120 and is coupled to the housing body 20 (FIG. 1 and FIG. 2). Furthermore, the holding body 60 is provided with a housing chamber 62 for an electric wire (not illustrated). The electric wire electrically connects the busbar 120 to the battery monitoring unit 300. The holding body 60 is also provided with a lid body 63 that covers an opening of the housing chamber 62.

The coupling structure 70 is placed between adjacent housing members 10 along the terminal arrangement direction (FIG. 9 to FIG. 15). The coupling structure 70 includes a first coupling body 71 that is disposed in one of the two housing members 10 to be coupled, a second coupling body 72 that is disposed in the other, and a holding mechanism 73 that holds the first coupling body 71 and the second coupling body 72 in a state in which the first coupling body 71 and the second coupling body 72 are coupled to each other. In the housing member 10, the first coupling body 71 and the second coupling body 72 are placed individually on both ends of the housing body 20 in the terminal arrangement direction.

The exemplary first coupling body 71 is disposed as part of the housing body 20. The first coupling body 71 has a bottom part 71a that forms a part of the housing chamber 20b, a first vertical wall part 71b, and a second vertical wall part 71c (FIG. 9 to FIG. 15). The bottom part 71a is one end of the terminal arrangement direction in the bottom part 21 of the housing body 20 and is assigned a rectangular area in the end. Although the undersurface of the exemplary bottom part 71a is offset from the primary portion of the undersurface of the bottom part 21, it may be flush with the primary portion of the undersurface. The first vertical wall part 71b and the second vertical wall part 71c are vertically disposed from the bottom part 71a with a space interposed between the first vertical wall part 71b and the second vertical wall part 71c. The first vertical wall part 71b is one end of the terminal arrangement direction in the first vertical wall part 22 of the housing body 20 and is assigned a rectangular area in the end. The first vertical wall part 71b is part of the first vertical wall part 22 and thus have the same flexibility as that of the first vertical wall part 22. The second vertical wall part 71c is one end of the terminal arrangement direction in the second vertical wall part 23 of the housing body 20 and is assigned a rectangular area in the end. The second vertical wall part 71c is part of the second vertical wall part 23 and thus have the same flexibility as that of the second vertical wall part 23.

The exemplary second coupling body 72 is formed to project from the other end of the terminal arrangement direction in the housing body 20 so as to cover a space between the first vertical wall part 71b and the second vertical wall part 71c in the bottom part 71a inside the housing chamber 20b of the housing body 20 (FIG. 11 and FIG. 13 to FIG. 15). Specifically, the second coupling body 72 is formed so as to be capable of hiding an end on the first vertical wall part 71b side of the bottom part 71a and an end on the second vertical wall part 71c side of the bottom part 71a. For example, in the first coupling body 71, the inward space is formed into a rectangular parallelepiped shape by the bottom part 71a, the first vertical wall part 71b, and the second vertical wall part 71c. Consequently, the second coupling body 72 is formed as a piece body or a rectangular parallelepiped body fitted to the shape of the space and the shape of the bottom part 71a. Herein, the second coupling body 72 is illustrated that is formed as a piece body. The second coupling body 72 has a first end 72a that covers the first vertical wall part 71b side of the bottom part 71a, and a second end 72*b* that covers the second vertical wall part 71*c* side of the bottom part 71*a* (FIG. 9, FIG. 11, and FIG. 13 to FIG. 15). The second coupling body 72 is housed in the housing chamber 20*b* through the housing port 20*a*.

The holding mechanism 73 includes a first projection 73*a* that projects from the second coupling body 72 toward the first vertical wall part 71*b* side, a second projection 73*b* that projects from the second coupling body 72 toward the second vertical wall part 71*c* side, a first through-hole 73*c* that is formed at least in the first vertical wall part 71*b* and into which the first projection 73*a* is inserted, and a second through-hole 73*d* that is formed at least in the second vertical wall part 71*c* and into which the second projection 73*b* is inserted (FIG. 9 and FIG. 13 to FIG. 15). The first projection 73*a* projects from the first end 72*a* of the second coupling body 72. The first end 72*a* is an end that faces the first vertical wall part 71*b* in the second coupling body 72, and covers at least part of the first vertical wall part 71*b*. The second projection 73*b* is an end that faces the second vertical wall part 71*c* in the second coupling body 72, and covers at least part of the second vertical wall part 71*c*. The exemplary first projection 73*a* and the second projection 73*b* are formed in such a size that does not cause the first vertical wall part 71*b* and the second vertical wall part 71*c*, respectively, to project outside of the housing chamber 20*b*.

In the holding mechanism 73, the second coupling body 72, the first through-hole 73*c*, and the second through-hole 73*d* are formed such that the second coupling body 72 covers the first through-hole 73*c* and the second through-hole 73*d* from the inside of the housing chamber 20*b* when the first projection 73*a* and the second projection 73*b* are respectively inserted into the first through-hole 73*c* and the second through-hole 73*d*. For example, the first through-hole 73*c* is formed into a shape so that the first end 72*a* of the second coupling body 72 can hide the first through-hole 73*c* from the inside of the housing chamber 20*b*. The second through-hole 73*d* is formed into a shape so that the second end 72*b* of the second coupling body 72 can hide the second through-hole 73*d* from the inside of the housing chamber 20*b*. This structure enables gaps between the inside and the outside of the housing chamber 20*b* associated with the first through-hole 73*c* and the second through-hole 73*d* to be narrowed in the housing member 10.

In the coupling structure 70, when the second coupling body 72 is housed from the housing port 20*a* into the housing chamber 20*b*, the first projection 73*a* and the second projection 73*b* cause the first vertical wall part 71*b* and the second vertical wall part 71*c*, respectively, to be bent outward. The exemplary first through-hole 73*c* is formed in a corner that is a boundary between the bottom part 71*a* and the first vertical wall part 71*b*. The exemplary second through-hole 73*d* is formed in a corner that is a boundary between the bottom part 71*a* and the second vertical wall part 71*c*. Consequently, the second coupling body 72 is housed into a position so as to be superposed on the bottom part 71*a* in the coupling structure 70. In the coupling structure 70, when the second coupling body 72 reaches the superposed position, the first projection 73*a* is inserted into the first through-hole 73*c* and the second projection 73*b* is inserted into the second through-hole 73*d*, thereby eliminating the bending of the first vertical wall part 71*b* and the second vertical wall part 71*c*. The coupling structure 70 can, therefore, hold the first coupling body 71 and the second coupling body 72 in a state in which the first coupling body 71 and the second coupling body 72 are coupled to each other.

Figure 9:
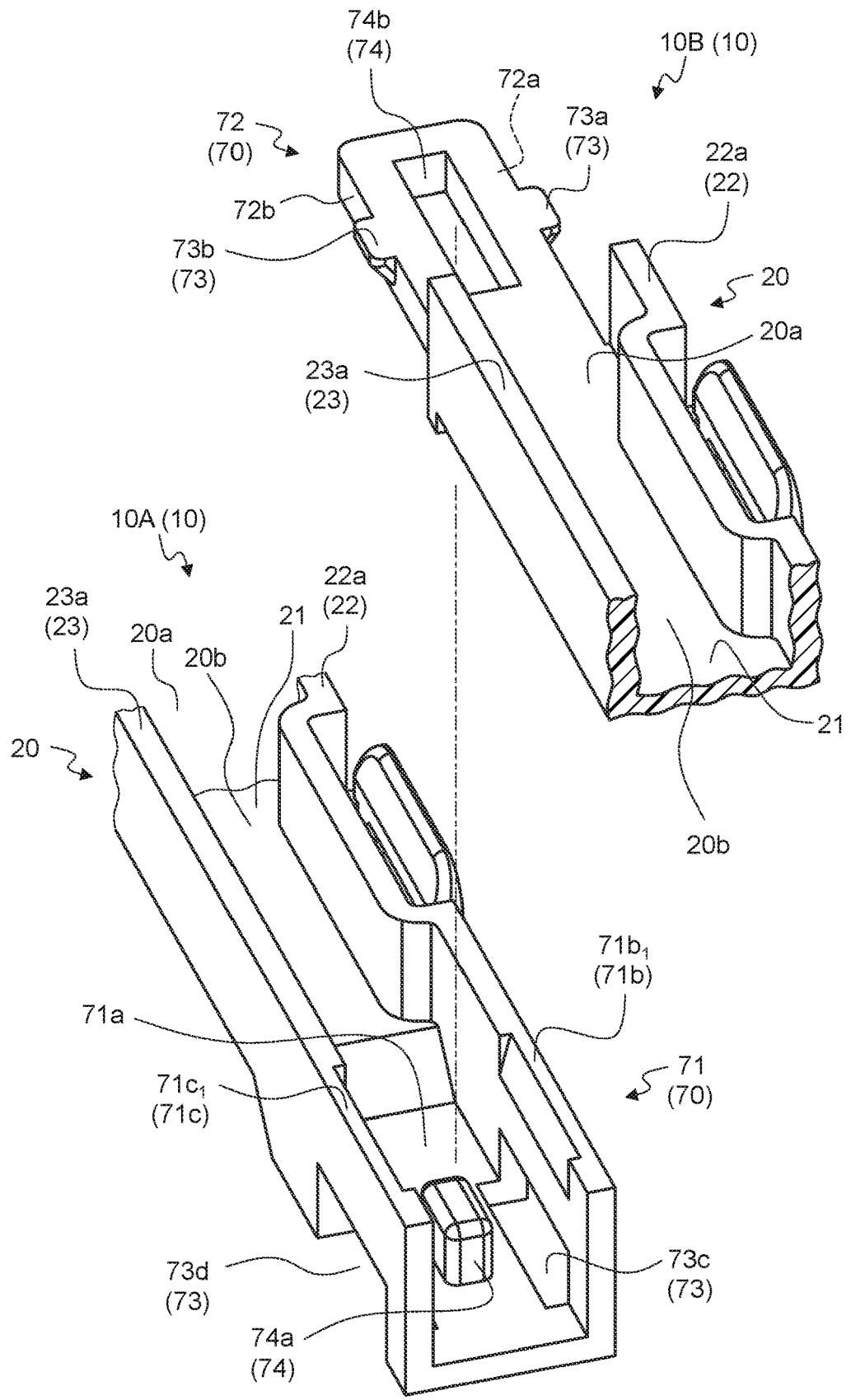
FIG. 9 is a perspective view illustrating a separated state of a coupling structure.
Figure 10:
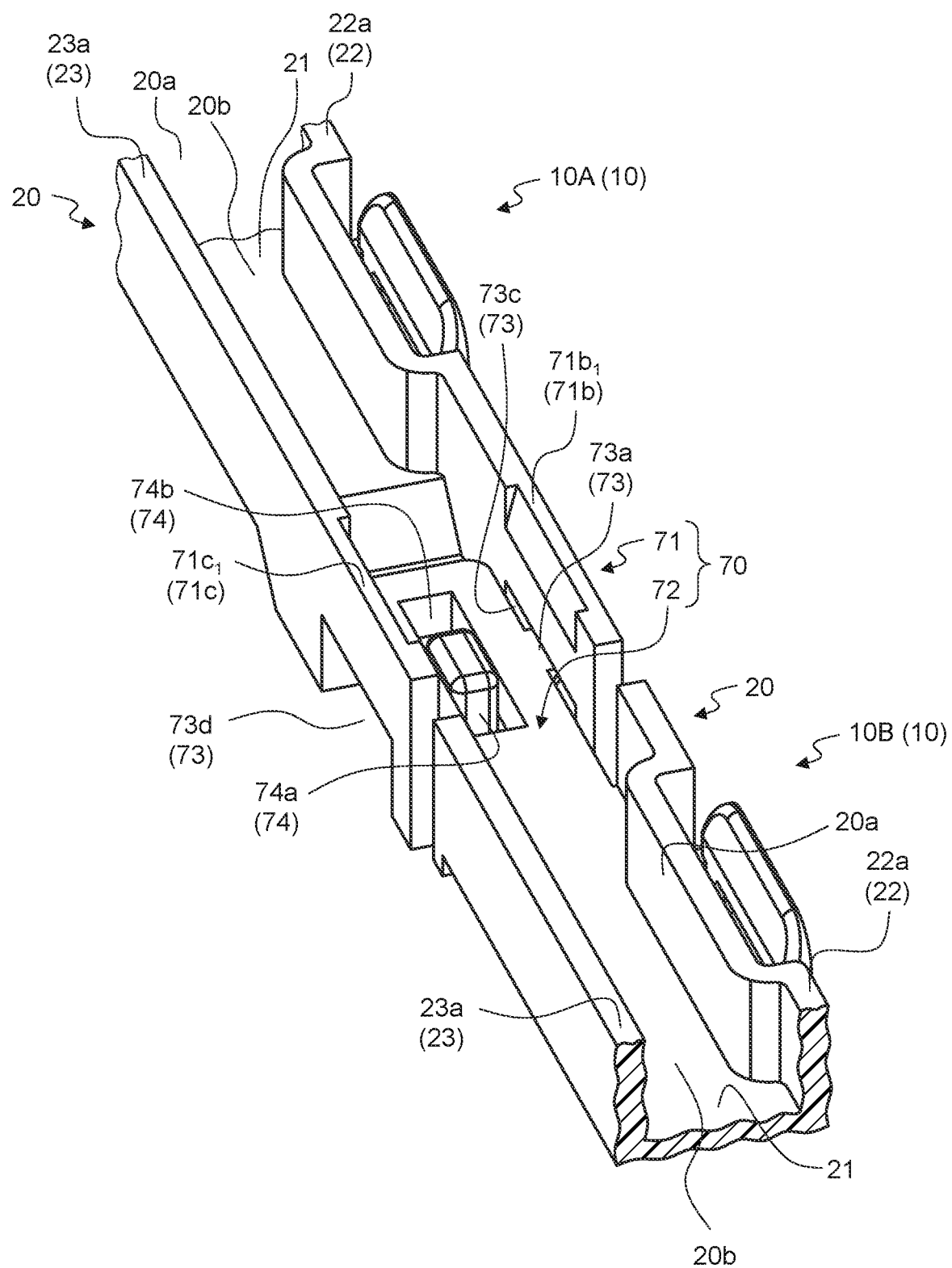
FIG. 10 is a perspective view illustrating a coupled state of the coupling structure.
Figure 11:
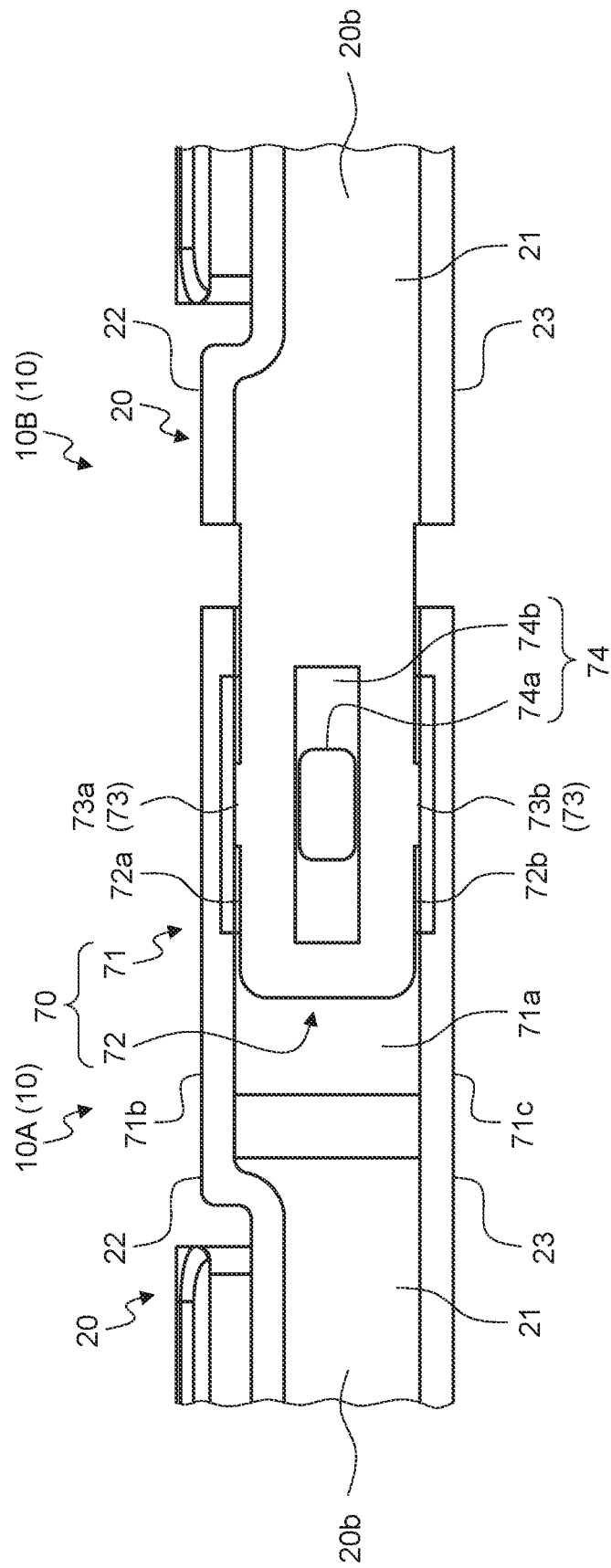
FIG. 11 is a plan view illustrating the coupled state of the coupling structure.
Figure 12:
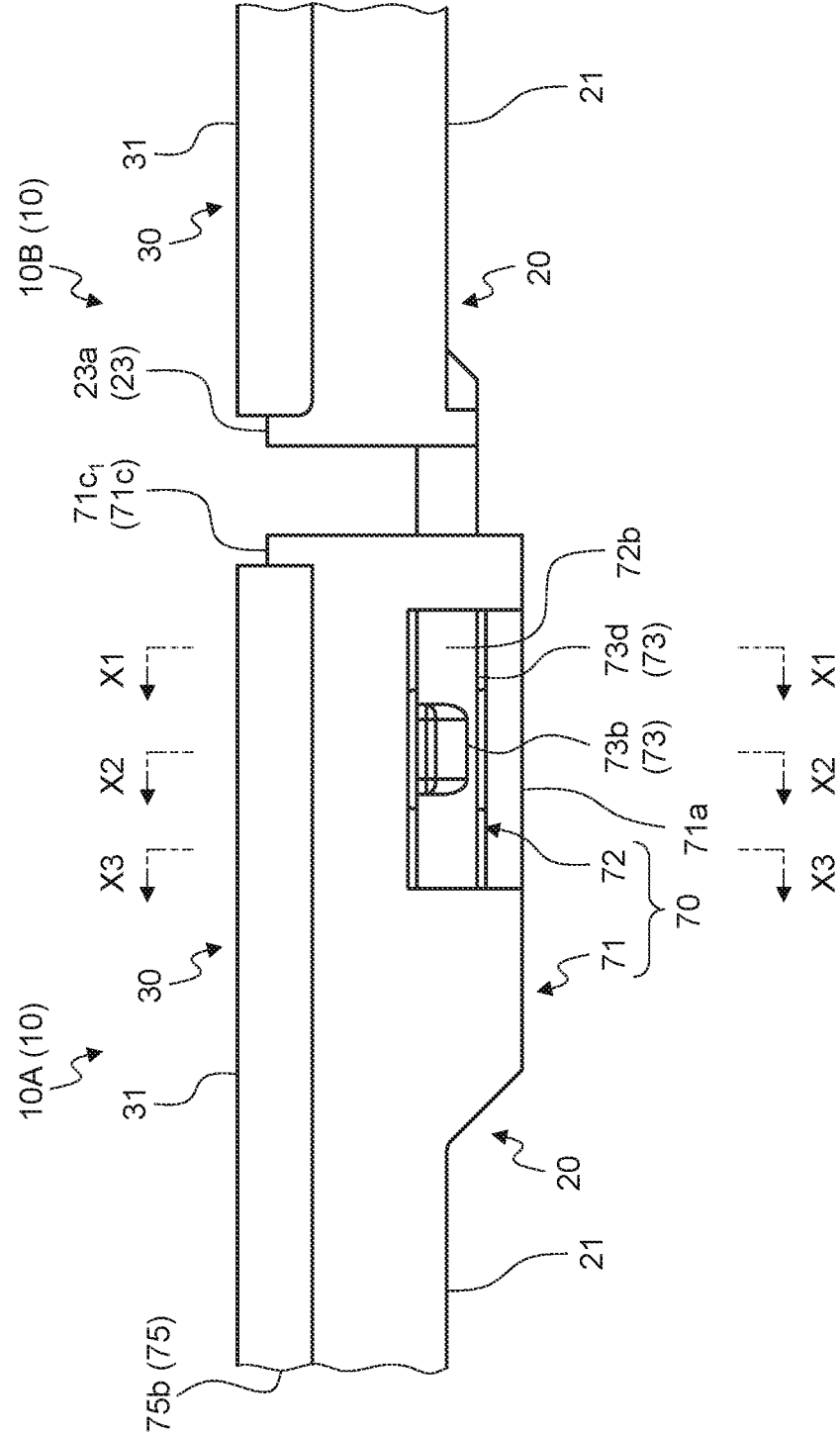
FIG. 12 is a side view illustrating the coupled state of the coupling structure.

The coupling structure 70 includes a position adjusting mechanism 74 that causes the first coupling body 71 and the second coupling body 72 kept in the coupled state to be moved relative to each other along the arrangement direction of the two housing members 10 that are coupled to each other (that is, the terminal arrangement direction) (FIG. 9 and FIG. 11). The position adjusting mechanism 74 adjusts the relative position between the two adjacent housing members 10 that are linked by the first coupling body 71 and the second coupling body 72, by changing the relative position between the first coupling body 71 and the second coupling body 72.

The position adjusting mechanism 74 can be made up of a combination of the first projection 73*a* and the first through-hole 73*c* and a combination of the second projection 73*b* and the second through-hole 73*d* in the holding mechanism 73. For example, in the former combination, the first through-hole 73*c* is formed so as to be capable of guiding the first projection 73*a* in the terminal arrangement direction. The first through-hole 73*c* is formed such that the magnitude of a relative movement direction between the first coupling body 71 and the second coupling body 72 is a value obtained by adding the magnitude of the relative movement direction in the first projection 73*a* to a target relative movement amount (the maximum value of the target relative movement amount between the first coupling body 71 and the second coupling body 72, for example). In the latter combination, the second through-hole 73*d* is formed so as to be capable of guiding the second projection 73*b* in the terminal arrangement direction. The second through-hole 73*d* is formed such that the magnitude of the relative movement direction between the first coupling body 71 and the second coupling body 72 is a value obtained by adding the magnitude of the relative movement direction in the first projection 73*a* to the target relative movement amount. In this manner, the coupling structure 70 enables the first coupling body 71 and the second coupling body 72 kept in the coupled state to be moved relative to each other by the target relative movement amount at a maximum.

In the coupling structure 70, even when the first coupling body 71 and the second coupling body 72 are moved relative to each other, the gaps are narrowed between the inside and the outside of the housing chamber 20*b* associated with the first through-hole 73*c* and the second through-hole 73*d*. Consequently, the second coupling body 72, the first through-hole 73*c*, and the second through-hole 73*d* are formed such that the second coupling body 72 covers the first through-hole 73*c* and the second through-hole 73*d* from the inside of the housing chamber 20*b* even when the first coupling body 71 and the second coupling body 72 are moved relative to each other. In the coupling structure 70, the magnitude of the terminal arrangement direction in the first projection 73*a* and the second projection 73*b*, the magnitude of the terminal arrangement direction in the first through-hole 73*c* and the second through-hole 73*d*, and the length of the terminal arrangement direction in the first end 72*a* and the second end 72*b* of the second coupling body 72, for example, may be determined considering a case of the maximum relative movement. Thus, even when the first coupling body 71 and the second coupling body 72 are moved relative to each other by the maximum amount, the gaps can be narrowed between the inside and the outside of the housing chamber 20*b* associated with the first through-hole 73*c* and the second through-hole 73*d* in the housing member 10.

In the coupling structure 70, the position adjusting mechanism 74 may include another aspect with the aspect that uses the holding mechanism 73 described above. The position adjusting mechanism 74 includes, as another aspect, a guided part 74a that is disposed in one of the bottom part 71a of the first coupling body 71 and the second coupling body 72, and a guide part 74b that is disposed in the other and that is capable of guiding the guided part 74a in the relative movement direction by the target relative movement amount (FIG. 9 and FIG. 11). In this example, the guided part 74a is disposed in the bottom part 71a and the guide part 74b is disposed in the second coupling body 72. For example, the guided part 74a is formed as a projecting body that projects in a rectangular parallelepiped shape from the bottom part 71a in the housing chamber 20b. The guide part 74b is formed in the second coupling body 72 as a rectangular through-hole into which the guided part 74a is inserted. The guide part 74b is formed such that the magnitude of the relative movement direction between the first coupling body 71 and the second coupling body 72 is a value obtained by adding the magnitude of a relative movement direction in the guided part 74a to a target relative movement amount. In the coupling structure 70, even if such a position adjusting mechanism 74 is disposed, the first coupling body 71 and the second coupling body 72 kept in the coupled state can be moved relative to each other by the target relative movement amount at a maximum.

For example, in the battery modules 100, thermal expansion or thermal contraction of the battery cells 110 changes the shape in the cell arrangement direction in some cases. The position adjusting mechanism 74 can vary the relative position of the housing member 10 in the terminal arrangement direction (that is, the cell arrangement direction), so that the position adjusting mechanism 74 can absorb the change in the shape of the battery module 100 and improve the durability of the coupling structure 70.

As illustrated above, the first vertical wall part 71b and the second vertical wall part 71c of the first coupling body 71 both have flexibility of being capable of being bent with the bottom part 71a side as a fulcrum. Consequently, the first vertical wall part 71b and the second vertical wall part 71c might be bent when external force is applied by a housing object, for example, in the housing chamber 20b. Such bending of the first vertical wall part 71b and the second vertical wall part 71c might release the held state between the first projection 73a and the first through-hole 73c in the holding mechanism 73 and the held state between the second projection 73b and the second through-hole 73d. For this reason, the coupling structure 70 is provided with a bending restricting mechanism 75 that restricts occurrence of bending in the first vertical wall part 71b and the second vertical wall part 71c (FIG. 4, FIG. 5, and FIG. 13 to FIG. 15).

Figure 13:
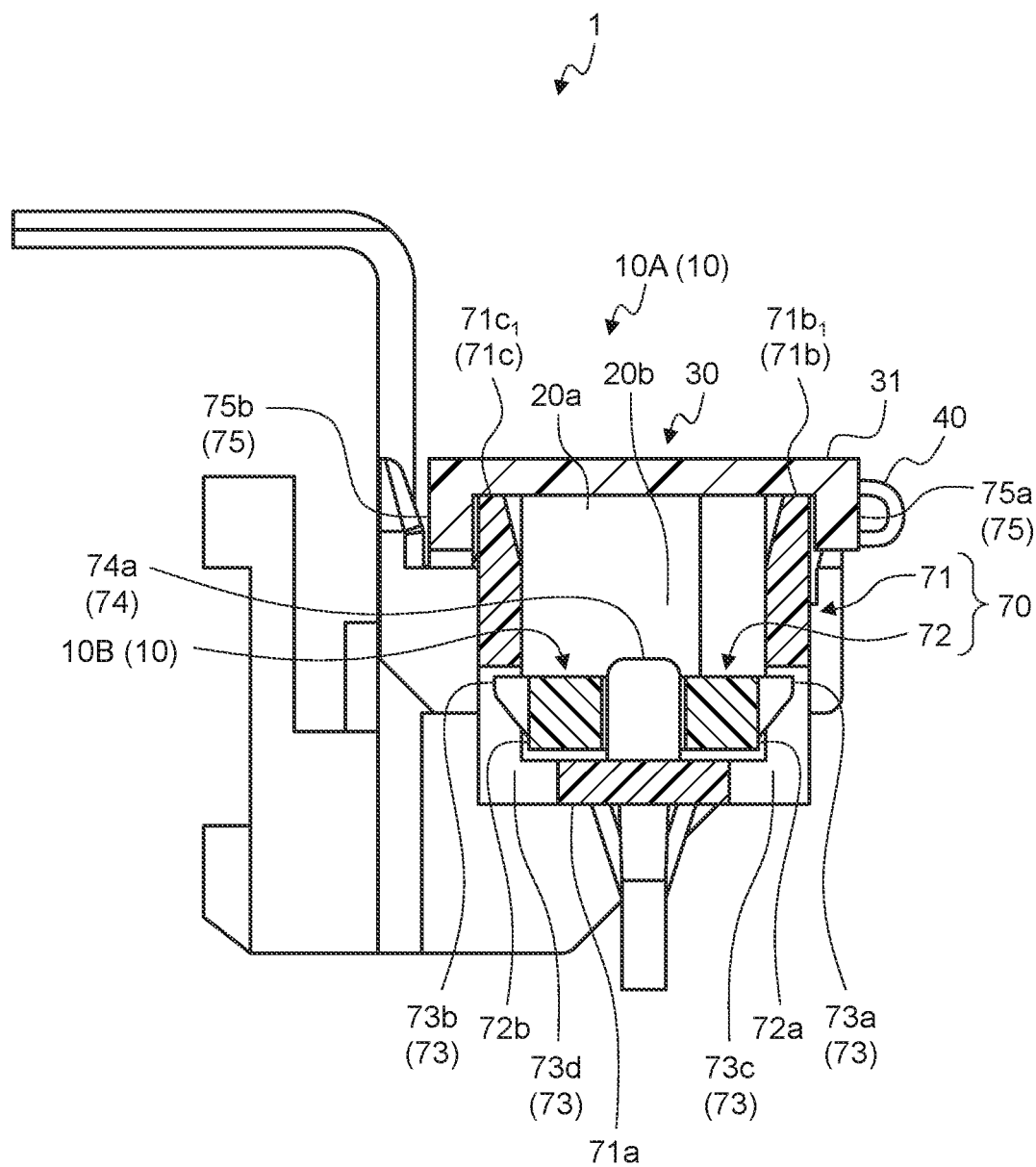
FIG. 13 is a sectional view taken along line X1-X1 in FIG. 12.
Figure 14:
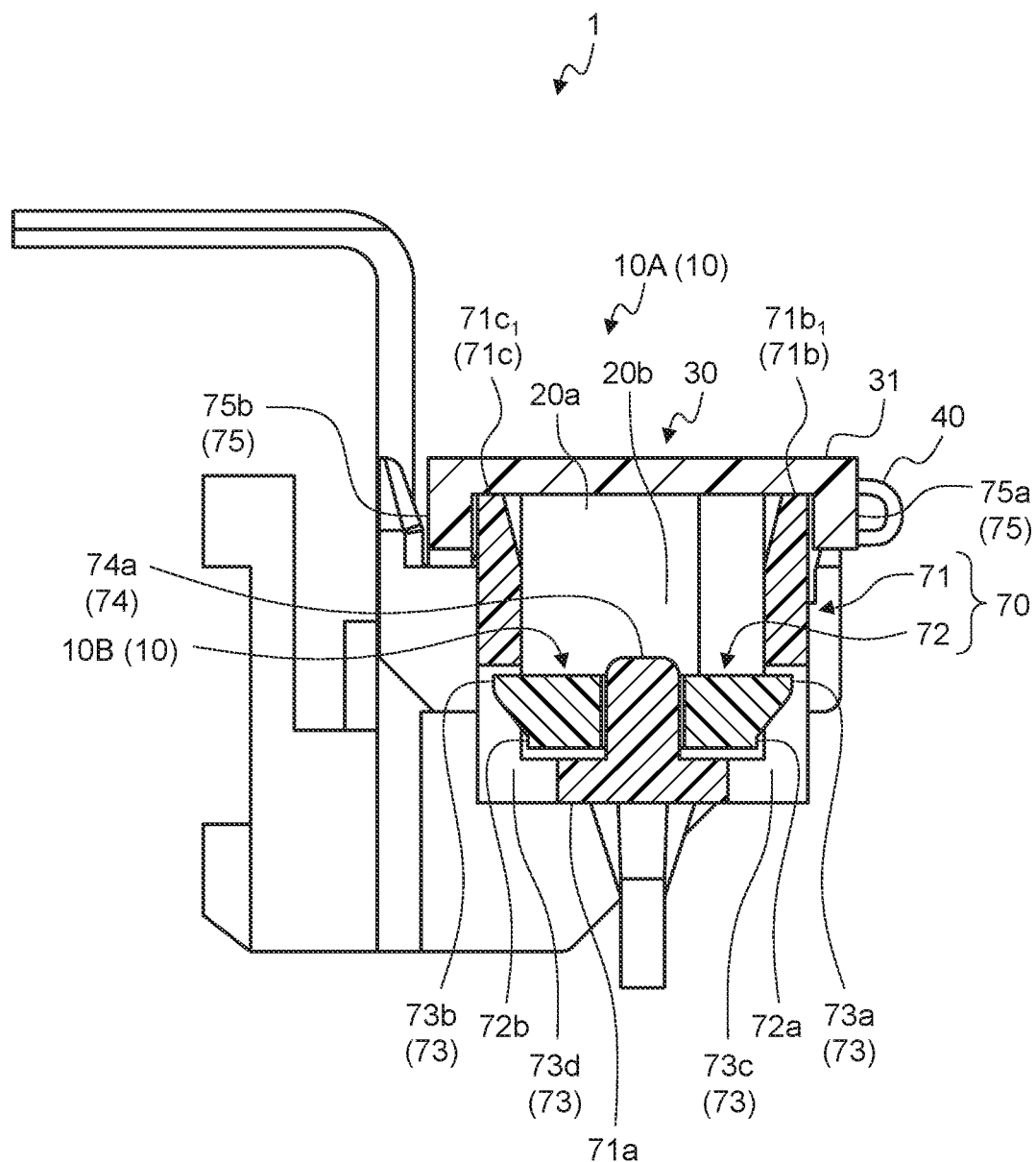
FIG. 14 is a sectional view taken along line X2-X2 in FIG. 12.
Figure 15:
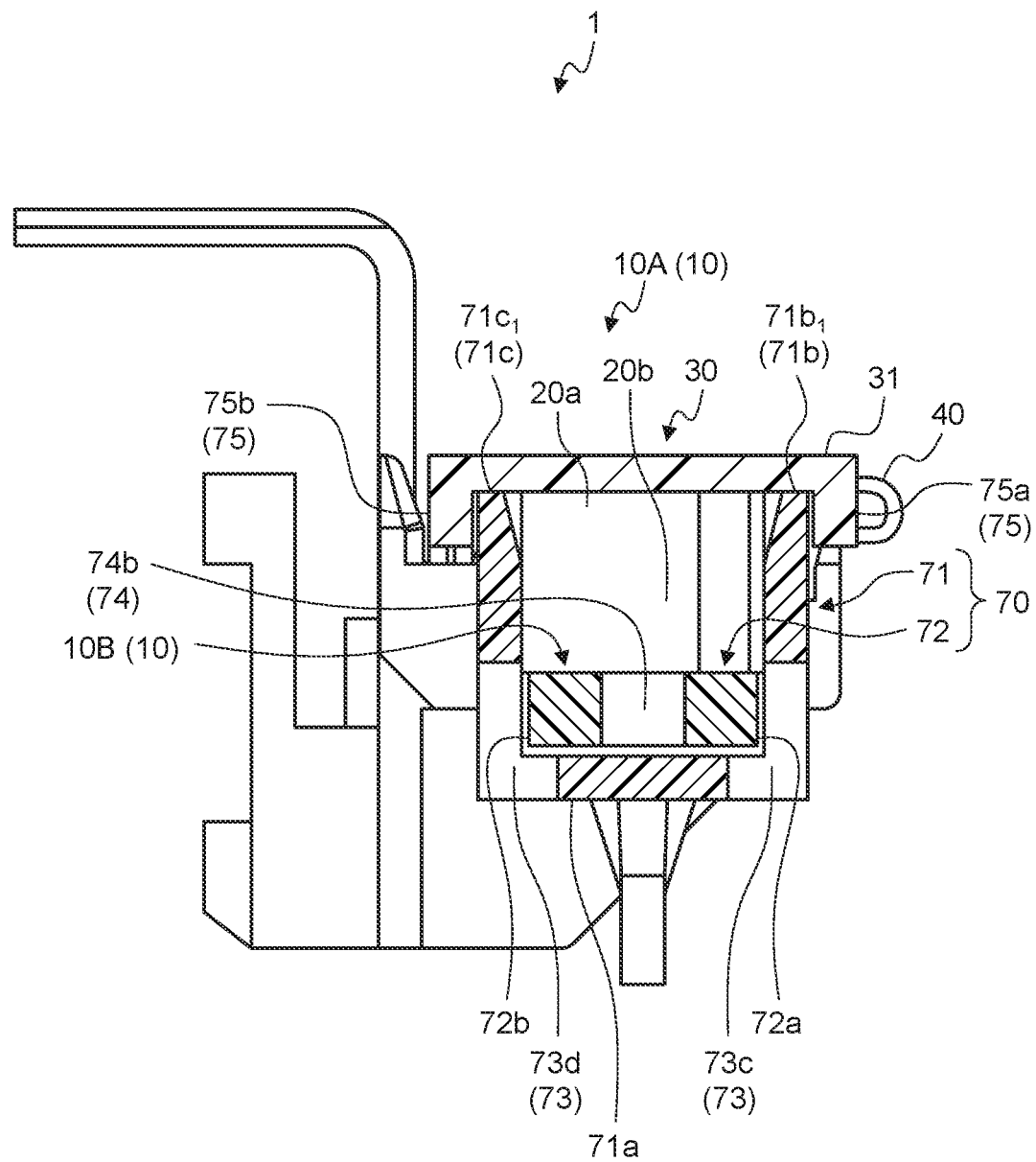
FIG. 15 is a sectional view taken along line X3-X3 in FIG. 12.

The bending restricting mechanism 75 is disposed in the lid body 30 of the housing body 20 that has the first coupling body 71. The lid body 30 is provided with a first locking part 75a and a second locking part 75b, as the bending restricting mechanism 75, that respectively pinch a free end $71b_1$ of the first vertical wall part 71b and a free end $71c_1$ of the second vertical wall part 71c while locking them, with the coupled state of the first coupling body 71 and the second coupling body 72 held by the holding mechanism 73 (FIG. 13 to FIG. 15). The first locking part 75a and the second locking part 75b are projecting bodies that project from the lid part 31 so as to face the housing body 20 side in the blocked position. The first locking part 75a and the second locking part 75b project from both ends of the lid part 31 in a direction orthogonal to the terminal arrangement direction so as to respectively pinch the free ends $71b_1$, $71c_1$ while locking them from the outside of the housing chamber 20b, with no bending occurring in the first vertical wall part 71b and the second vertical wall part 71c. In this manner, the bending restricting mechanism 75 can restrict occurrence of bending in the first vertical wall part 71b and the second vertical wall part 71c after the housing port 20a is covered by the lid body 30.

For example, the free end $71b_1$ of the first vertical wall part 71b is part of the free end 22a of the first vertical wall part 22. The free end $71c_1$ of the second vertical wall part 71c is also part of the free end 23a of the second vertical wall part 23. Consequently, the exemplary first locking part 75a and the second locking part 75b each have a portion that has a rectangular shape projecting from the corresponding end of the lid part 31 so as to respectively pinch the free ends 22a, 23a while locking them from the outside over the entire terminal arrangement direction, with no bending occurring in the first vertical wall part 22 and the second vertical wall part 23. Note, however, that the first locking part 75a and the second locking part 75b are each provided with a notch in such a manner as to avoid the place in which the holding mechanism 50 is placed between the housing body 20 and the lid body 30, for example.

As described above, the coupling structure 70 of the housing member 10 enables the gaps between the inside and the outside of the housing chamber 20b associated with the first through-hole 73c and the second through-hole 73d to be narrowed, thereby improving the blocking property of the housing chamber 20b. Consequently, the coupling structure 70 can prevent foreign matters from entering the housing chamber 20b through the first through-hole 73c and the second through-hole 73d, so that the protection function for the housing object that is housed in the housing chamber 20b can also be improved.

In the coupling structure 70, the bending restricting mechanism 75 can restrict occurrence of bending in the first vertical wall part 71b and the second vertical wall part 71c, so that the coupled state of the first coupling body 71 and the second coupling body 72 by the holding mechanism 73 can be kept even if external force is applied to the first vertical wall part 71b and the second vertical wall part 71c.

The coupling structure 70 has a structure in which the second coupling body 72 is housed in an inward space of the first coupling body 71, and also has the holding mechanism 73 in which the first projection 73a and the second projection 73b do not protrude from the first vertical wall part 71b and the second vertical wall part 71c, respectively, outside of the housing chamber 20b. Consequently, the coupling structure 70 can be put in place independent of the width of the housing body 20 in the direction orthogonal to the terminal arrangement direction. The width of the housing member 10 in the direction orthogonal to the terminal arrangement direction can, therefore, be reduced in the coupling structure 70.

The storage case 1 includes such a coupling structure 70 between the housing members 10 to be coupled to each other so as to be capable of obtaining the same effect as that of the coupling structure 70.

In the coupling structure of the housing members according to the present embodiment, the gaps between the inside and the outside of the housing chamber associated with the first through-hole and the second through-hole can be narrowed by the relation between the second coupling body and the first through-hole and the second through-hole, thereby improving the blocking property of the housing chamber. The storage case according to the present invention includes such a coupling structure between housing members to be coupled to each other so as to be capable of obtaining the same effect as that of the coupling structure.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A coupling structure of housing members comprising:
    a first coupling body that is disposed in one of two housing members to be coupled;
    a second coupling body that is disposed in the other of the two housing members; and
    a holding mechanism that holds the first coupling body and the second coupling body in a state in which the first coupling body and the second coupling body are coupled to each other, wherein
    the first coupling body is disposed as part of a housing body of the housing member in which at least a conductive member is housed as a housing object, has a bottom part that forms a part of a housing chamber for the housing object, and has a first vertical wall part and a second vertical wall part that are vertically disposed from the bottom part with a space interposed between the first vertical wall part and the second vertical wall part,
    the second coupling body is disposed so as to face the bottom part in a stacked state in the housing chamber, and formed so as to cover a space between the first vertical wall part and the second vertical wall part in the bottom part inside the housing chamber,
    the holding mechanism includes a first projection that projects from a first end of the second coupling body toward a side of the first vertical wall part, a second projection that projects from a second end of the second coupling body toward a side of the second vertical wall part, a first through-hole that is formed in the first coupling body and into which the first projection is inserted, and a second through-hole that is formed in the first coupling body and into which the second projection is inserted, the first end covering at least part of the first vertical wall part, the second end covering at least part of the second vertical wall part,
    the first through-hole is formed in a first corner that is a boundary between the bottom part and the first vertical wall part such that the first through-hole extends through each of the bottom part and the first vertical wall part,
    the second through-hole is formed in a second corner that is a boundary between the bottom part and the second vertical wall part such that the second through-hole extends through each of the bottom part and the second vertical wall part, and
    the second coupling body covers the first through-hole and the second through-hole from an inside of the housing chamber by covering the first through-hole and the second through-hole in the bottom part, covering the first through-hole in the first vertical wall part with the first end of the second coupling body, and covering the second through-hole in the second vertical wall part with the second end of the second coupling body, when the first projection and the second projection are respectively inserted into the first through-hole and the second through-hole.

2. The coupling structure of housing members according to claim 1, further comprising:
    a position adjusting mechanism that causes the first coupling body and the second coupling body kept in a coupled state to be moved relative to each other along an arrangement direction of the two housing members that are coupled to each other.

3. The coupling structure of housing members according to claim 2, wherein
    the housing member that has the first coupling body includes the housing body in which the second coupling body and the housing object are housed through a housing port, and a lid body that covers the housing port,
    the housing body has flexibility so that the first vertical wall part and the second vertical wall part are both capable of being bent with a side of the bottom part as a fulcrum, and also uses, as the housing port, an opening between respective free ends of the first vertical wall part and the second vertical wall part, the free ends being on a side opposite to the side of the bottom part, and
    the lid body has a first locking part and a second locking part that respectively pinch the free end of the first vertical wall part and the free end of the second vertical wall part while locking the free ends, with the coupled state of the first coupling body and the second coupling body held by the holding mechanism.

4. The coupling structure of housing members according to claim 3, wherein
    the conductive member is an electric wire that is electrically connected both to one of two electrode terminals included in each of a plurality of arranged battery cells and to a battery monitoring unit that monitors a battery state of the battery cells, or/and is an electric wire that electrically connects a temperature detector that detects temperatures of the battery cells to the battery monitoring unit.

5. The coupling structure of housing members according to claim 2, wherein
    the conductive member is an electric wire that is electrically connected both to one of two electrode terminals included in each of a plurality of arranged battery cells and to a battery monitoring unit that monitors a battery state of the battery cells, or/and is an electric wire that electrically connects a temperature detector that detects temperatures of the battery cells to the battery monitoring unit.

6. The coupling structure of housing members according to claim 2, wherein
    the first through-hole is formed so as to guide the first projection in the arrangement direction,
    the second through-hole is formed so as to guide the second projection in the arrangement direction, and
    the second coupling body, the first though-hole, and the second through-hole are formed such that the second coupling body covers the first through-hole and the second through-hole even when the first coupling body and the second coupling body are relatively moved by the position adjusting mechanism.

7. The coupling structure of housing members according to claim 1, wherein
    the housing member that has the first coupling body includes the housing body in which the second coupling body and the housing object are housed through a housing port, and a lid body that covers the housing port,
    the housing body has flexibility so that the first vertical wall part and the second vertical wall part are both capable of being bent with a side of the bottom part as a fulcrum, and also uses, as the housing port, an opening between respective free ends of the first vertical wall part and the second vertical wall part, the free ends being on a side opposite to the side of the bottom part, and the lid body has a first locking part and a second locking part that respectively pinch the free end of the first vertical wall part and the free end of the second vertical wall part while locking the free ends, with the coupled state of the first coupling body and the second coupling body held by the holding mechanism.

8. The coupling structure of housing members according to claim 7, wherein the conductive member is an electric wire that is electrically connected both to one of two electrode terminals included in each of a plurality of arranged battery cells and to a battery monitoring unit that monitors a battery state of the battery cells, or/and is an electric wire that electrically connects a temperature detector that detects temperatures of the battery cells to the battery monitoring unit.

9. The coupling structure of housing members according to claim 1, wherein the conductive member is an electric wire that is electrically connected both to one of two electrode terminals included in each of a plurality of arranged battery cells and to a battery monitoring unit that monitors a battery state of the battery cells, or/and is an electric wire that electrically connects a temperature detector that detects temperatures of the battery cells to the battery monitoring unit.

10. A storage case comprising:

a plurality of housing members in each of which at least a conductive member is housed as a housing object; and a coupling structure that couples two of the housing members to be coupled, wherein the coupling structure includes:

a first coupling body that is disposed in one of the two housing members to be coupled;

a second coupling body that is disposed in the other of the two housing members; and a holding mechanism that holds the first coupling body and the second coupling body in a state in which the first coupling body and the second coupling body are coupled to each other, the first coupling body is disposed as part of a housing body of the housing member in which the housing object is housed, has a bottom part that forms a part of a housing chamber for the housing object, and has a first vertical wall part and a second vertical wall part that are vertically disposed from the bottom part with a space interposed between the first vertical wall part and the second vertical wall part, the second coupling body is disposed so as to face the bottom part in a stacked state in the housing chamber, and formed so as to cover a space between the first vertical wall part and the second vertical wall part in the bottom part inside the housing chamber, the holding mechanism includes a first projection that projects from a first end of the second coupling body toward a side of the first vertical wall part, a second projection that projects from a second end of the second coupling body toward a side of the second vertical wall part, a first through-hole that is formed in the first coupling body and into which the first projection is inserted, and a second through-hole that is formed in the first coupling body and into which the second projection is inserted, the first end covering at least part of the first vertical wall part, the second end covering at least part of the second vertical wall part, the first through-hole is formed in a first corner that is a boundary between the bottom part and the first vertical wall part such that the first through-hole extends through each of the bottom part and the first vertical wall part, the second through-hole is formed in a second corner that is a boundary between the bottom part and the second vertical wall part such that the second through-hole extends through each of the bottom part and the second vertical wall part, and the second coupling body covers the first through-hole and the second through-hole from an inside of the housing chamber by covering the first through-hole and the second through-hole in the bottom part, covering the first through-hole in the first vertical wall part with the first end of the second coupling body, and covering the second through-hole in the second vertical wall part with the second end of the second coupling body, when the first projection and the second projection are respectively inserted into the first through-hole and the second through-hole.

\* \* \* \* \*